United States Patent
Jaber

(10) Patent No.: US 10,795,952 B2
(45) Date of Patent: Oct. 6, 2020

(54) IDENTIFICATION OF DOCUMENTS BASED ON LOCATION, USAGE PATTERNS AND CONTENT

(71) Applicant: MICROSOFT TECHNOLOGY LICENSING, LLC, Redmond, WA (US)

(72) Inventor: Rayyan Jaber, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 541 days.

(21) Appl. No.: 15/600,600

(22) Filed: May 19, 2017

(65) Prior Publication Data

US 2018/0189404 A1    Jul. 5, 2018

Related U.S. Application Data

(60) Provisional application No. 62/442,902, filed on Jan. 5, 2017, provisional application No. 62/442,911, filed
(Continued)

(51) Int. Cl.
  *G06F 16/9535* (2019.01)
  *G06F 16/487* (2019.01)
(52) U.S. Cl.
  CPC ........ *G06F 16/9535* (2019.01); *G06F 16/487* (2019.01)
(58) Field of Classification Search
  None
  See application file for complete search history.

(56) References Cited

U.S. PATENT DOCUMENTS 7,836,056 B2   11/2010   Meijer et al.
8,176,004 B2    5/2012   Malaney et al.
(Continued)

FOREIGN PATENT DOCUMENTS

WO    2016036288 A1    3/2016
WO    2016069666 A1    5/2016

OTHER PUBLICATIONS

"International Search Report and Written Opinion Issued in PCT Application No. PCT/US2018/012012", dated Mar. 16, 2018, 10 Pages.
(Continued)

*Primary Examiner* — Christopher J Raab
(74) *Attorney, Agent, or Firm* — Newport IP, LLC; Jacob P. Rohwer

(57) ABSTRACT

Technologies are described herein for the identification of documents based on location, usage patterns, and content. In some configurations, techniques disclosed herein cause documents to be identified that are relevant to the location of the user and the current context of the user. Some illustrative configurations involve identifying documents that are associated with a particular location. In addition to using location information, other data can be analyzed to identify documents that are relevant to the current location of the user and/or the current context of the user. The other data can also include data such as, but not limited to, calendar data, document data (e.g., contents of documents, metadata associated with documents), organizational charts, and contact lists. The documents that are relevant to the meeting participants and the subject of the meeting can then be presented to the user for easy access.

17 Claims, 6 Drawing Sheets

Related U.S. Application Data on Jan. 5, 2017, provisional application No. 62/442,915, filed on Jan. 5, 2017.

(56) References Cited

U.S. PATENT DOCUMENTS

| | | | |
|---|---|---|---|
| 8,554,767 B2* | 10/2013 | Song | G06Q 30/02 |
| | | | 707/732 |
| 8,655,028 B2 | 2/2014 | Hsi | |
| 8,949,353 B1 | 2/2015 | Beguin | |
| 9,043,329 B1* | 5/2015 | Patton | G06F 16/285 |
| | | | 707/740 |
| 9,141,709 B1 | 9/2015 | Keslin et al. | |
| 9,282,138 B2 | 3/2016 | Grewal et al. | |
| 9,501,745 B2 | 11/2016 | Nitz et al. | |
| 9,853,959 B1 | 12/2017 | Kapczynski et al. | |
| 10,171,579 B2 | 1/2019 | Larabie-Belanger | |
| 2005/0271352 A1 | 12/2005 | Yokouchi | |
| 2008/0147790 A1 | 6/2008 | Malaney et al. | |
| 2011/0218997 A1 | 9/2011 | Boiman et al. | |
| 2012/0072500 A1 | 3/2012 | Greene et al. | |
| 2012/0078747 A1 | 3/2012 | Chakrabarti et al. | |
| 2012/0110463 A1 | 5/2012 | Brolley et al. | |
| 2012/0303654 A1 | 11/2012 | Ferris | |
| 2013/0007057 A1 | 1/2013 | Li et al. | |
| 2013/0086087 A1* | 4/2013 | Jung | G06F 16/487 |
| | | | 707/752 |
| 2013/0104080 A1 | 4/2013 | Bosworth et al. | |
| 2013/0263289 A1 | 10/2013 | Vijayan et al. | |
| 2014/0067455 A1* | 3/2014 | Zhang | G06Q 10/109 |
| | | | 705/7.24 |
| 2014/0122592 A1 | 5/2014 | Houston et al. | |
| 2014/0143247 A1 | 5/2014 | Rathnavelu et al. | |
| 2014/0258297 A1 | 9/2014 | Davari | |
| 2014/0330776 A1 | 11/2014 | Chen | |
| 2015/0052126 A1 | 2/2015 | Bordino et al. | |
| 2015/0186467 A1* | 7/2015 | Voonna | G06F 16/24575 |
| | | | 707/736 |
| 2015/0304400 A1 | 10/2015 | Spivack et al. | |
| 2016/0217784 A1* | 7/2016 | Gelfenbeyn | G10L 15/22 |
| 2016/0246885 A1 | 8/2016 | Aravamudhan et al. | |
| 2016/0261669 A1 | 9/2016 | Elliott | |
| 2017/0097933 A1 | 4/2017 | Rajan et al. | |
| 2017/0097939 A1 | 4/2017 | Zhu et al. | |
| 2017/0097951 A1 | 4/2017 | Nachiappan et al. | |
| 2017/0118165 A1 | 4/2017 | Kumar | |

OTHER PUBLICATIONS

Yang, et al., "NIR: Content based image retrieval on cloud computing", In IEEE International Conference on Intelligent Computing and Intelligent Systems, Dec. 28, 2009, pp. 556-559.

"Final Office Action Issued in U.S Appl. No. 15/600,619", dated May 8, 2019, 22 Pages.

"Non-Final Office Action Issued in U.S Appl. No. 15/600,619", dated Jan. 11, 2019, 26 Pages.

Squicciarini, et al., "Privacy Policy Inference of User-Uploaded Images on Content Sharing Sites", In Proceedings of the IEEE Transactions on Knowledge and Data Engineering, vol. 27, Issue 1, Jan. 1, 2015, pp. 193-206.

"Final Office Action Issued in U.S. Appl. No. 15/600,619", dated Feb. 6, 2020, 35 Pages.

"Non Final Office Action Issued in U.S. Appl. No. 15/600,619", dated Jul. 25, 2019, 27 Pages.

\* cited by examiner

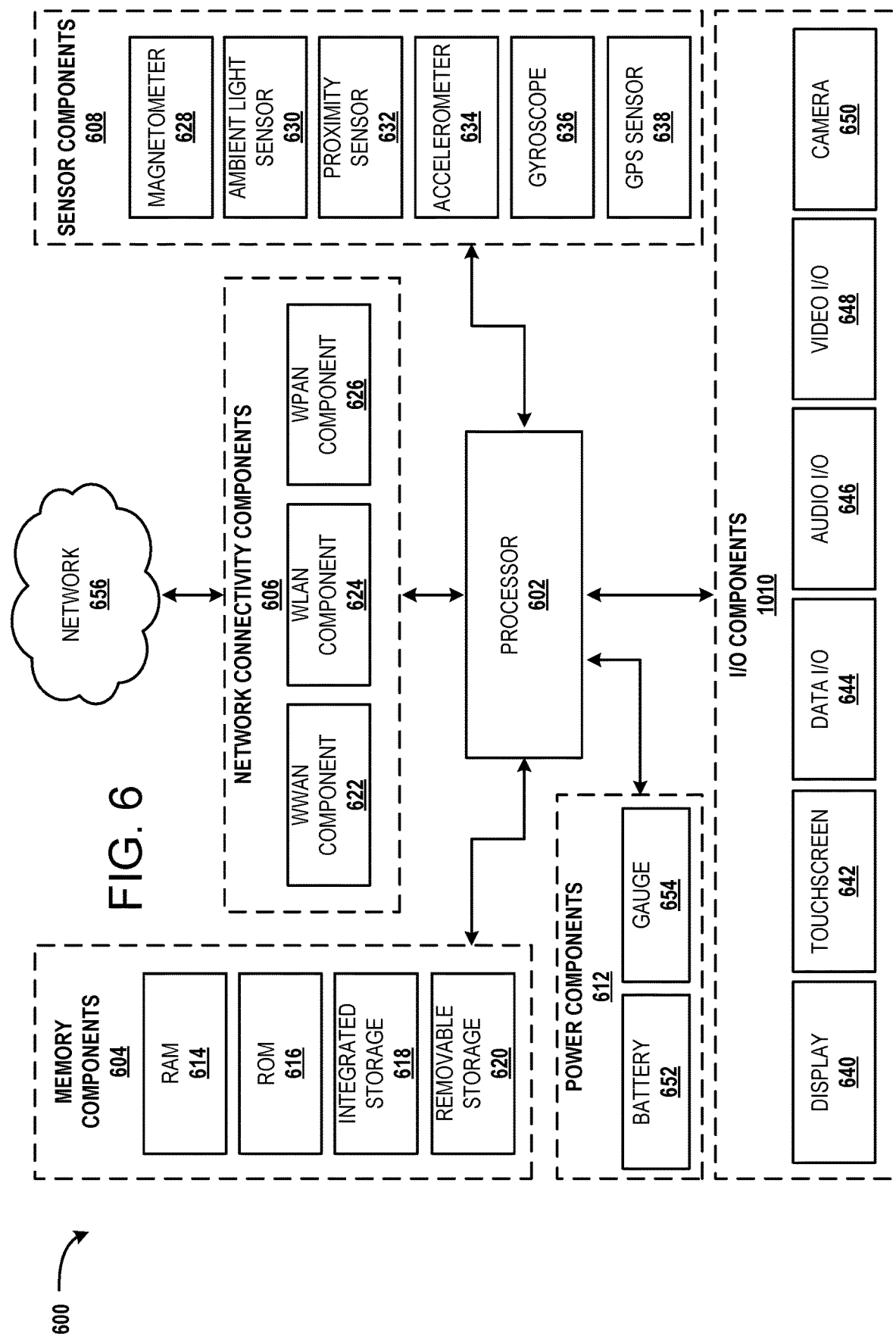

IDENTIFICATION OF DOCUMENTS BASED ON LOCATION, USAGE PATTERNS AND CONTENT

CROSS REFERENCE TO RELATED CASES

This Application claims the benefit of U.S. Patent Application No. 62/442,902, filed on Jan. 5, 2017, U.S. Patent Application No. 62/442,911, filed on Jan. 5, 2017, and U.S. Patent Application No. 62/442,915, filed on Jan. 5, 2017, which are hereby incorporated by reference in their entirety.

BACKGROUND

In recent years, it has become more common for people to access and store files using remote storage services. For example, a person may use remote storage services to store and access files from home, work, or school. Not only may an individual have a personal account with a remote storage service, the individual may also have a business account with the remote storage service. In many cases, a user can have hundreds, if not thousands, of documents stored by a remote storage service. Although these services enable users to access and store data from multiple locations, it can be difficult or time consuming for a user to manually locate the documents they are interested in viewing.

It is with respect to these and other considerations that the disclosure made herein is presented.

SUMMARY

Technologies are described herein for identification of documents based on location, usage patterns, and content. According to some configurations, documents are identified that are relevant to the location of the user and the current context of the user. Some illustrative configurations involve identifying documents that are associated with a particular location. For example, a first set of documents can be displayed while the user is at a first location (e.g. work), and a second set of documents can be displayed while the user is at a second location (e.g., a store). Instead of a user having to request documents that are relevant to a particular location, the system can identify documents that are relevant to the particular location and automatically provide them for display within a graphical user interface element before the user requests one of the documents. In some configurations, the system updates the document recommendations in response to identifying that the location has changed to another location that is associated with the user. For example, the system can determine that the user has created or accessed a document while at a specific location and/or performed a search for a document while at the specific location.

In addition to using location information, other data can be analyzed to identify documents that are relevant to the current location of the user and/or the current context of the user. For example, when the user is at a grocery store, documents relating to grocery shopping and documents that have previously been accessed, or created, while at the grocery store can be displayed to the user. For illustrative purposes, documents can include image data, text data, or any other forms of data in any suitable format. Thus, in a variation of the above example, a user can take a picture of a receipt while in the grocery store. When the user returns to that same grocery store, the user's device can automatically retrieve the picture of the receipt. The documents that are determined to be relevant can be word-processing documents, notes, messages, photographs, music files, video files, and the like.

The techniques disclosed herein can also use contextual data to identify and retrieve documents that are associated with a particular location. The current context of the user provides an indication of what activity the user is performing at the location. A number of resources can provide the contextual data such as, but not limited to, calendar data, document data (e.g., contents of documents, metadata associated with documents), organizational charts, and contact lists. As an example, when a user is in a meeting, calendar data can be used to identify that the user is in the meeting, the subject of the meeting, and identify users at the meeting. The documents that are relevant to the meeting participants and the subject of the meeting can then be presented to the user for easy access.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 is a computer architecture diagram illustrating a computing device architecture for a computing device capable of implementing aspects of the techniques and technologies presented herein.

DETAILED DESCRIPTION

Figure 1:
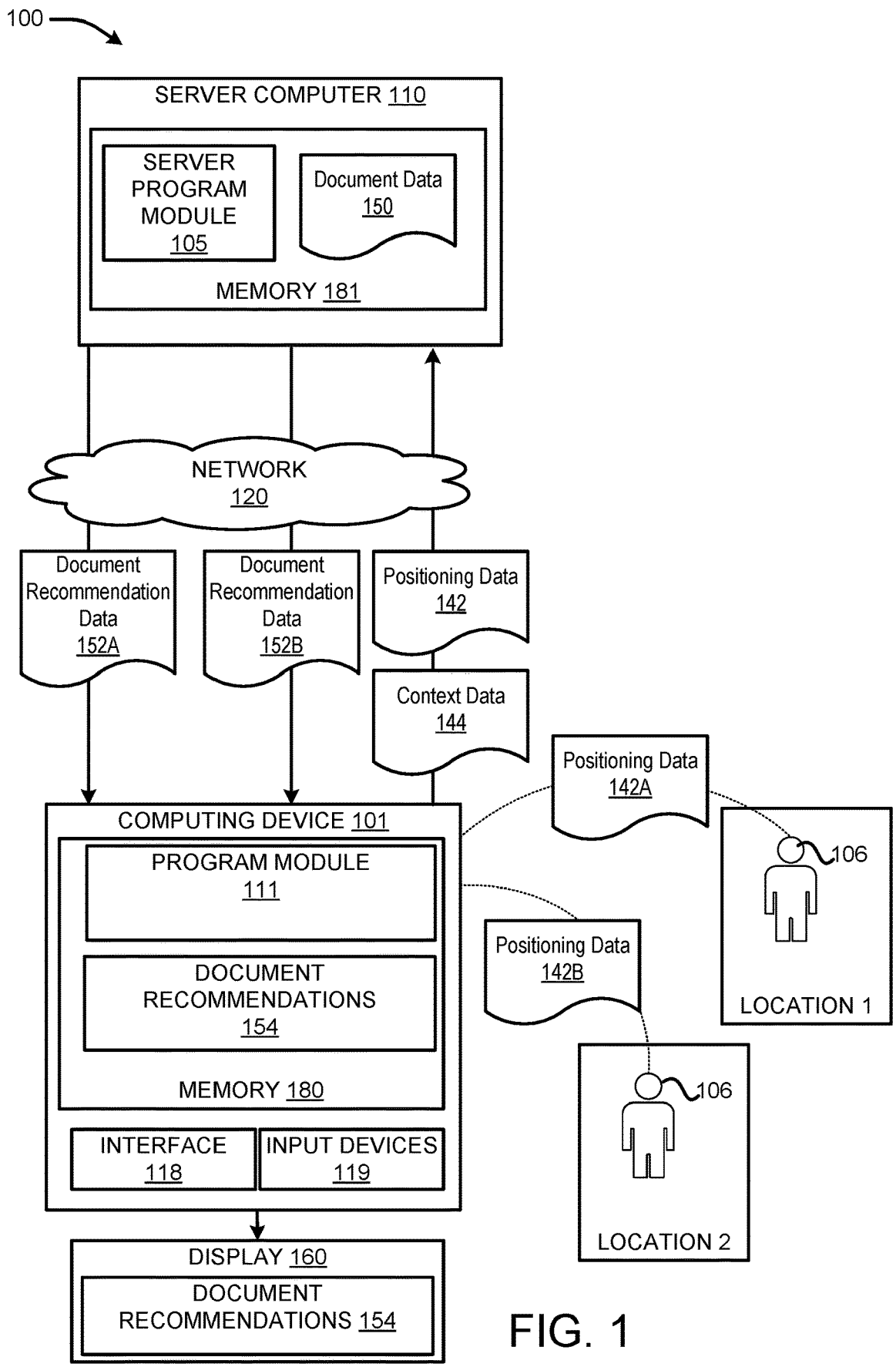
FIG. 1 is a block diagram showing several example components of a system for identification of documents based on location, usage patterns, and content.

The following detailed description is directed to concepts and technologies for identification of documents based on location, usage patterns, and content. According to some configurations, documents are identified that are relevant to the location of the user and the current context of the user. For example, when the user is at the store shopping for groceries, a first set of documents relevant to the user shopping at the store can be presented. The documents that are determined to be relevant can be word-processing documents, notes, messages, photographs, music files, video files, and the like. Similarly, when the user is at the gym, a second set of documents (e.g., a picture of a gym membership card, a workout log) can be displayed that are relevant to the user while at the gym. Instead of the user having to manually search for the documents they are interested in viewing, the system recommends documents that are determined to be relevant the user at the particular location.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for identification of documents based on location, usage patterns, and content. As will be described in more detail below with respect to FIGS. 4-6, there are a number of applications and services that can embody the functionality and techniques described herein.

FIG. 1 is a system diagram showing aspects of one illustrative mechanism disclosed herein for identification of documents based on location, usage patterns, and content. As shown in FIG. 1, a system 100 may include a computing device 101, a server computer 110 and a network 120. The computing device 101 may operate as a stand-alone device, or the computing device 101 may operate in conjunction with the server computer 110 to perform the techniques disclosed herein. For illustrative purposes, one computing device 101 is shown in FIG. 1 and it can be appreciated that more computing devices 101 may be used in implementations of the described techniques.

It can also be appreciated that the server computer 110 may be a personal computing device, a server or a number of computing devices configured to perform the techniques described herein. It can be also appreciated that the server computer 110 and the computing device 101 are interconnected through one or more local and/or wide area networks, such as the network 120. It should be appreciated that many more network connections may be utilized than illustrated in FIG. 1.

The computing device 101 may include memory 180 storing data associated with document recommendations 154, and a program module 111. In addition, the server computer 110 may also include memory 181 storing document data 150 associated with documents stored by/for the user associated with the computing device 101 (and possibly other users), and a server program module 105. According to some techniques, the server computer 110 provides at least a portion of the functionality of a storage service, such as the GOOGLE DRIVE storage service from GOOGLE, Inc., the DROPBOX storage service from DROPBOX or the ONEDRIVE storage service from MICROSOFT CORPORATION.

The computing device 101 may also store one or more program modules, such as program module 111, which may be in the form of a stand-alone application, a productivity application, an operating system component or any other application or software module having features that interact with a user via one or more input devices, such as the input devices 119. The input devices may be any device, such as a keyboard, and/or an interface (118), which may include a touch-enabled screen configured to receive gestures from one or more users. Each program module 111 may also be configured to manage and process the files and/or other data communicated with other computing devices. In the examples described in more detail below, each program module 111 may be configured to provide access to data, such as documents retrieved from a file storage service.

In some configurations, techniques disclosed herein cause data to be analyzed to identify documents that may be relevant to the user at the particular location. In the examples presented in FIG. 1, the user 106 is shown at a first location (location 1) and then at a second location (location 2). When the user 106 moves to location 1, positioning data 142A is obtained from a computing device, such as computing device 101, associated with the user. Similarly, when the user 106 moves to location 2, positioning data 142B is obtained from a computing device, such as computing device 101, associated with the user. The positioning data 142A and positioning data 142B may be referred to herein as positioning data 142.

The positioning data 142 can indicate a position of a user in an outdoor environment or an indoor environment. For example, the positioning data 142 can indicate that the user is within a particular room of a building, inside a store, near a building, or some other mapped resource, and the like. In some configurations, the positioning data 142 can indicate the movement of user devices within an environment. The positioning data 142 can include various types of data, such as a velocity of a user, a direction of a user, a number of steps taken by the user, a gesture performed by the user (e.g. raising and lowering a mobile computing device), and the like. The positioning data 142 can be received from one or more systems, such as one or more GPS devices, Bluetooth LE proximity beacons, wireless routers, W-Fi access points, or other suitable devices, can utilized by the techniques disclosed herein. In addition, configurations disclosed herein can analyze other types of data from other systems to identify a user and the user's position and/or pattern of movement. For instance, the system can utilize imaging technologies, such as facial recognition, to identify a person moving within a field of view of a camera or other type of detector or sensor. Data indicating the position of the camera, heat sensor, motion detector, sound detector or any other type of detector or sensor, can be utilized to identify the position and/or pattern of movement of a detected user. In some configurations, positioning data and other data can be analyzed from multiple systems and multiple computing devices to identify a position or a pattern of movement of one or more users.

In some examples, in response to the user 106 moving to a new location, the program module 111 sends positioning data 142 to the server program module 105. According to some configurations, the program module 111 can also send context data 144 (also referred to herein as "contextual data 144") to the server program module 105. The context data 144 can provide an indication of an activity associated with the user 106. For example, the context data 144 may indicate that the user is shopping while at location 1 and is attending a meeting in a conference room at location 2. In some configurations, location data can include positioning data and/or context data.

Instead of the user having to manually search for documents that are relevant to the user at a particular location, the server program module 105 identifies the documents that are relevant for the location of user in advance of the user requesting the documents. According to some techniques, the server program module 105 or some other component, accesses document data 150, and possibly other data (as described in more detail below) to identify the relevant documents. For instance, the document data 150 may include data describing documents that the user has accessed and/or created while at various locations. In the current example, the document data 150 may indicate that two different documents have been accessed by user 106 while at location 1, and ten different documents have been accessed by the user 106 while at location 2. The document data 150 might also be analyzed by the server program module 105 to identify content of documents, or metadata associated with the documents, stored by the storage service that is relevant to the current location of the user. For example, when the user is at a doctor's office, documents relating to medical insurance, prescriptions, and the like might be identified by parsing the contents of the documents and/or metadata looking for keywords relating to a doctor. Similarly, when the user 106 is located in a conference room attending a meeting about software, the server program module 105 may identify documents that relate to the subject of the meeting, have been accessed previously for meetings of similar subjects, and the like.

The documents that are identified can be any type of document, such as but not limited to word-processing documents, electronic messages, electronic photographs, electronic music files, video files, electronic notes, and the like. As an example, the server program module 105 can identify the photographs of receipts taken when the user was at a particular location, and when the user returns to the location, the pictures of the receipts can be presented to the user 106. Other document recommendations can also be provided. In some examples, the server program module 105, or some other component or user, can generate metadata that is stored within document data 150, or some other location, to tag the documents with location information, user information, contents of the files, and the like.

According to some techniques, the server program module 105 generates document recommendation data 152 without a specific request from user 106. For example, the program module 111 can be configured to execute in the background and provide the positioning data 142 to the server program module 105 in response to the user 106 moving to a new location. Instead of the server program module 105 updating the document recommendations at each new location, the server program module 105 updates the documents recommendations when the location has been associated with the user. The server program module 105 can determine whether the new location is associated with the user based on various criteria. In some configurations, a location is associated with a user when either a user has created a document at the location, a document has been received by the user at the particular location, or a document has previously been accessed by the user at the location. For example, a user may take a picture at the location and/or receive a picture while at the location. In other examples, the location is associated with a user based on a preference specified by the user. For instance, the user creates a preference of specific locations and/or types of locations (e.g., grocery stores, gym) that are to be associated with the user and recommendations provided. In other examples, a location is associated with the user based on past activity at the location. For example, the server program module 105 can determine that the user goes to the location some number of times a week, or that the user frequently accesses documents and/or generates documents at the location.

In some examples, the server program module 105 stores data, such as location data, that associates the data (e.g., a file that was generated at the location or received at the location, or otherwise associated with the location) with the location. According to some configurations, the server program module 105 also associates the contextual data of the user with the location and the data. For instance, a photograph that is taken at a store may be stored along with location data that indicates the associated location and the current context of the user shopping while at the location.

When the user opens up an application to access a document, the server program module 105 can already have provided the document recommendation data 152 to the program module 111. For example, the document recommendation data 154 can be presented within a graphical user interface on display 160. In this way, the user does not have to wait for the application to display the document recommendations 154 in response to a request from the user. In the current example, when the user 106 moves to location 1, the server program module 105 generates and sends the document recommendation 152A to computing device 101. When the user 106 moves away from location 1 (e.g., exceeds some predetermined distance from location 1) and moves to location 2, the server program module 105 generates and sends the document recommendation 152B to computing device 101. When the user 106 returns to location 1, the server program module 105 generates the document recommendation 152A that includes the data that was associated with the location. For example, if a picture was taken at location 1, then the document recommendation includes at least an identifier of the picture. In some examples, the picture itself could be automatically displayed on the display 160 without being specifically requested by the user. More details are provided below with reference to FIGS. 2-6.

Figure 2:
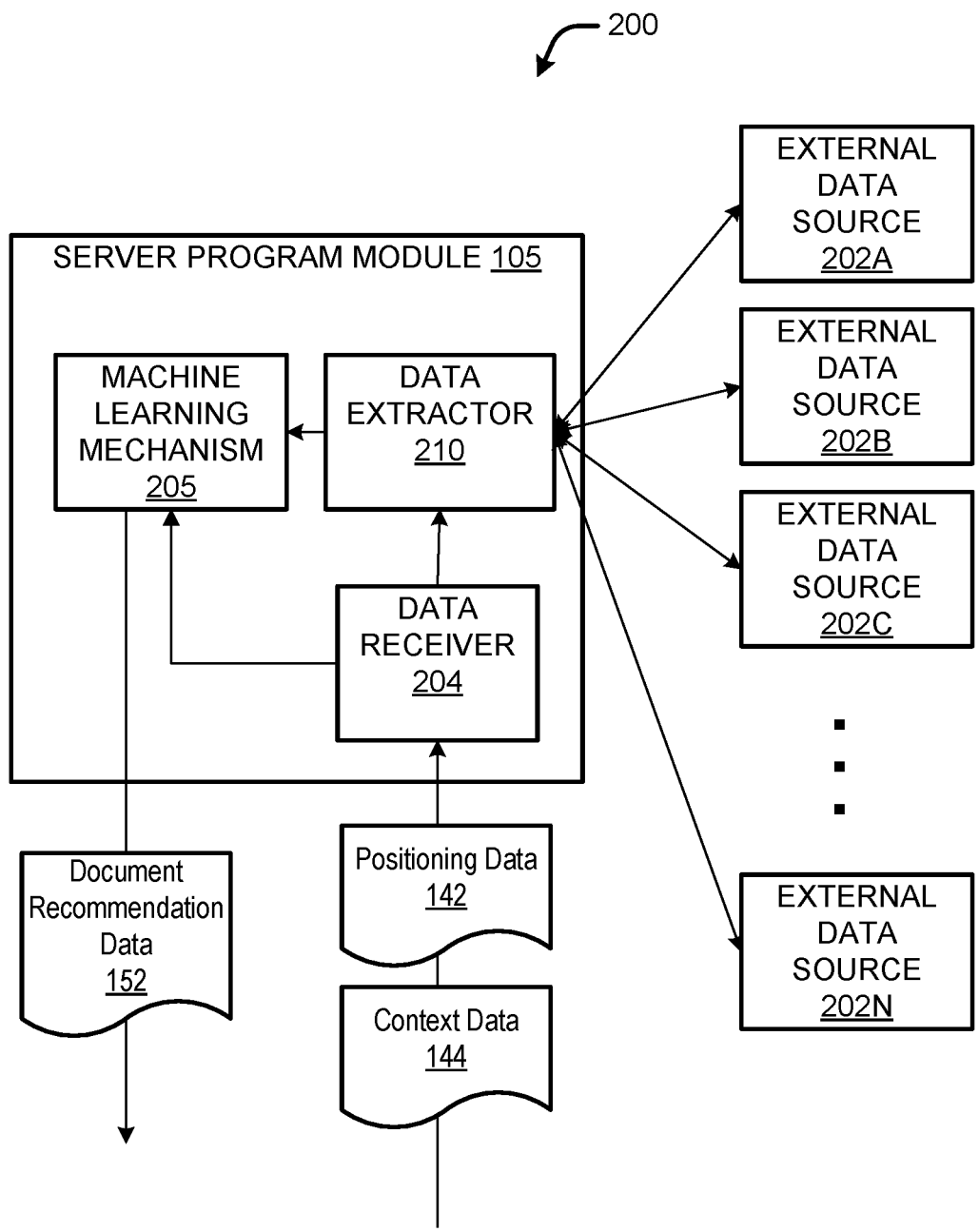
FIG. 2 is a block diagram showing several example components of a server program module for identification of documents based on location, usage patterns, and content.

FIG. 2 is a system diagram showing aspects of one illustrative mechanism of a server program module 105 disclosed herein for identification of documents based on location, usage patterns, and content. As shown in FIG. 2, system 200 illustrates server program module 105 in communication with external data sources 202A-202N. Server program module 105 includes machine learning mechanism 205, data extractor 210, and data receiver 204.

As described above, techniques disclosed herein cause documents to be identified that are relevant to a current location and/or context of a user to be presented to a user 106. As an example, when the user 106 moves to a new location, a computing device associated with the user sends positioning data 142 and/or context data 144 to the data receiver 204 of the server program module 105. As discussed above, in some configurations, the server program module 105 determines whether the location indicated by the positioning data is associated with the user. For example, the server program module 105 determines that the user has taken a photograph at the location, has performed a search to locate documents while at the location, has generated one or more documents at the location, and/or has otherwise accessed a document while at the location. In this way, the server program module 105 does not continually update the document recommendations for locations that are not of interest to the user. In other examples, the server program module 105 can generate document recommendations in response to the positioning data indicating that the user has entered a new area such as a building, a store, and the like.

The data extractor 210 of system 200 receives the positioning data 142 and/or the context data 144, as well as receiving data from one or more other external data sources 202A-202N. In some configurations, data obtained from one or more of external data sources 202A-202N, can be used to assist the system 200 in determining the documents that are relevant to the user while at the particular location. For instance, the system 200 can access and analyze data from calendar programs (e.g., is the user in a business meeting or is the user at a sporting event?), organization charts (e.g., who are other people in the business, what level are they, how are they related?), contact lists (e.g., personal contact list and/or business contact list), social networks, document management platforms, and the like to provide more indications of whether the data is personal or business related.

According to some techniques, the system 210 can use on or more machine learning mechanisms, such as machine learning mechanism 205, to assist in identifying the documents that are relevant to the user at the particular location and/or context. Generally, machine learning is a type of artificial intelligence that provides computers with the ability to recognize patterns and to use those patterns to perform actions on the data. The machine learning mechanisms utilized can be trained using supervised and/or unsupervised learning. Similarly, the machine learning technique can employ statistical analysis and or predictive analysis. Some types of machine learning mechanisms that can be utilized to determine the document recommendations include but are not limited to decision tree learning; association rule learning; artificial neural networks; deep learning; inductive logic programming; support vector machines; clustering; Bayesian networks; reinforcement learning; representation learning; manifold learning algorithms; similarity learning; sparse dictionary learning; genetic algorithms; rule-based machine learning; learning classifier systems; and the like. The machine learning mechanism 205 provides document recommendation data 152 that indicates the documents that are relevant to the user.

Figure 3:
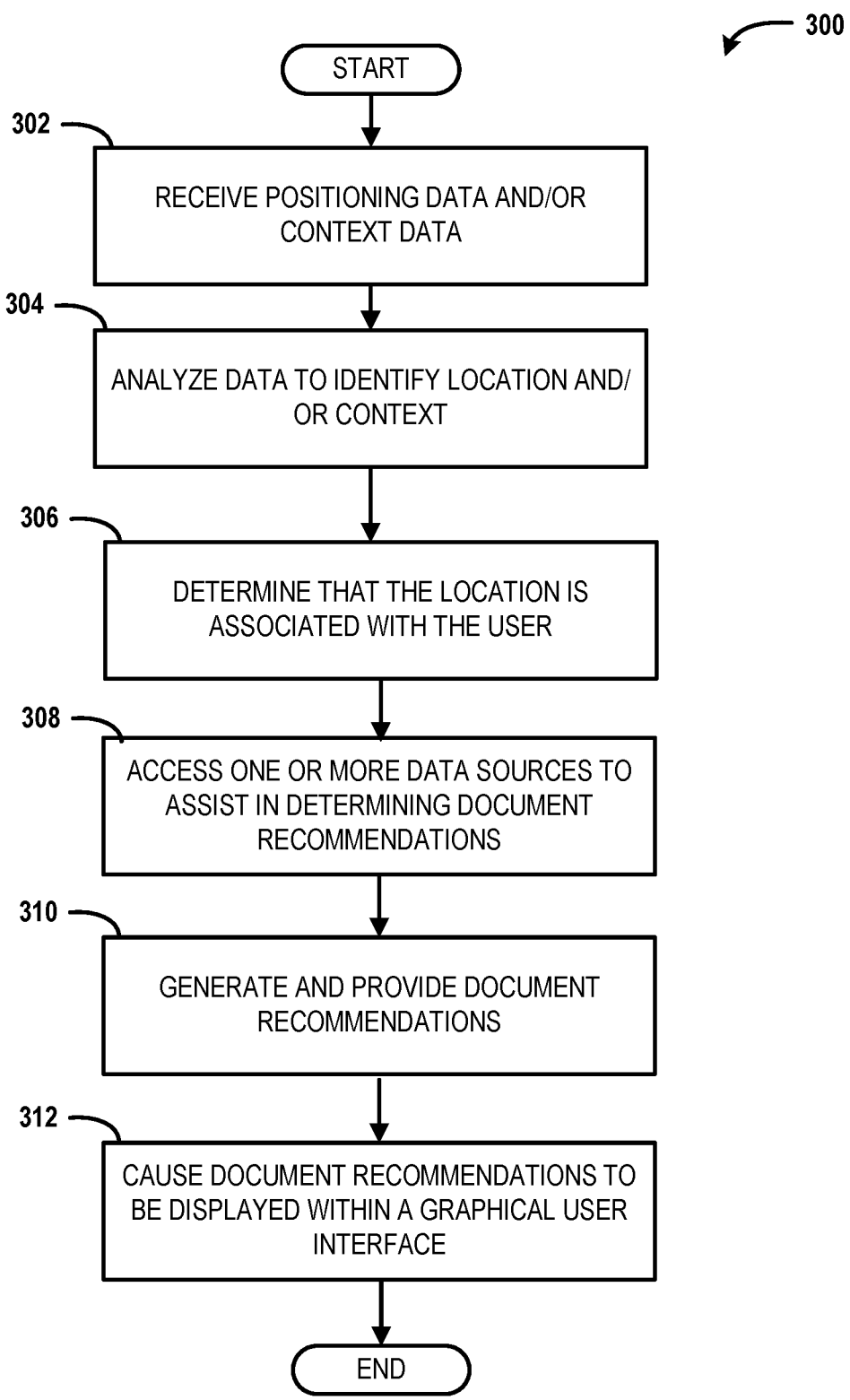
FIG. 3 is a flow diagram illustrating aspects of a method for identification of documents based on location, usage patterns, and content.

Turning now to FIG. 3, aspects of a routine 300 for identification of documents based on location, usage patterns, and content are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As will be described in more detail below, in conjunction with FIGS. 4-6, the operations of the routine 300 are described herein as being implemented, at least in part, by an application, such as the server program module 105 and/or the program module 111, or some other program module. Although the following illustration refers to the server program module 105, it can be appreciated that the operations of the routine 300 may be also implemented in many other ways. For example, the routine 300 may be implemented by the use of an application such as a content creation application or data processing application, e.g., a photograph application, a word processing application, a spreadsheet application, etc. In addition, one or more of the operations of the routine 300 may alternatively or additionally be implemented, at least in part, by a web browser application 410 of FIG. 4 or another application working in conjunction with one or more application servers 508 of FIG. 5.

With reference to FIG. 3, the routine 300 begins at operation 302, where the server program module 105 receives positioning data and/or context data. As summarized above, in response to a user 106 moving to a different location and/or changing context, a computing device associated with the user can send the positioning data and/or the context data to the server program module 105. In some illustrative examples, a device having a location component, such as a GPS component, can be used for generating the positioning data. In one illustrative example, operation 302 may involve a process of receiving an instruction or command from a computing device 101 associated with a user to generate document recommendations. The scope of the present disclosure includes any instruction, command or data that may be received that requests the document recommendations be generated.

At operation 304, the server program module 105 analyzes the data. As described above, the server program module 105 may determine the location of the computing device associated with the user based on the positioning data and can determine the current context of the user.

At 306, the server program module 105 determines that the location of the user is associated with the identified location. As discussed above, the server program module 105 can determine that the location is associated with the user based on different criteria, such as but not limited to whether the user created a document at the location, whether the user searched for a document while at the location, whether the user accessed a document while at the location, and the like.

At 308, one or more data sources are accessed in determining the document recommendations. As discussed above, the document recommendations can be based on the location of the user, and/or the activity of the user. In some examples, the server program module 105 identifies the documents that were created and/or edited at the particular location and includes the identified documents in the document recommendations. The server program module 105 may also identify documents that are associated with a particular activity as identified by the context data and include the identified documents in the document recommendations. For instance, if a user is shopping, the server program module 105 may identify documents created at the store, as well as documents relating to "shopping."

As discussed above, the server program module 105, can also access other data such as, but not limited to, calendar programs, organization charts, contact lists, social networks, document management platforms, and the like to assist in determining document recommendations. For example, a calendar program can identify other documents that were utilized while at the location.

As can be appreciated, the operations may involve a number of different factors or conditions for identifying documents. In some configurations, contextual information generated from one or more actions or conditions, such as an action of the user or an action of the requesting computing device, may be used in conjunction with the positioning data to identify the documents. In addition, a user setting or default setting may have one or more conditions or instructions that cause the selection of one or more subsets of data based on positioning data and/or other contextual information. In some configurations, the factors for identifying the document recommendations can be weighted.

Next, at 310, the system 100 generates and provides the document recommendations. As discussed above, the system can utilize a machine learning mechanism 205 to generate the document recommendations that are provided to the user. In some examples, the document recommendations are provided within a user interface display that is presented to the user. In some embodiments, the recommendation can be a sound, an automated voice describing a file, a text message, an email, the display of a list of files having a selected file in a predetermined location of the list, or any other form of communication for providing notice to a user.

At 312, the system 100 can cause the document recommendations to be displayed within a graphical user interface element. As discussed above, the server program module 105 can instruct the program module 111 to display, or have ready for display, the document recommendations before the user requests one or more of the documents. In this way, the document recommendations are available to the user without the user having to manually request a document. The routine 300 then terminates.

Figure 4:
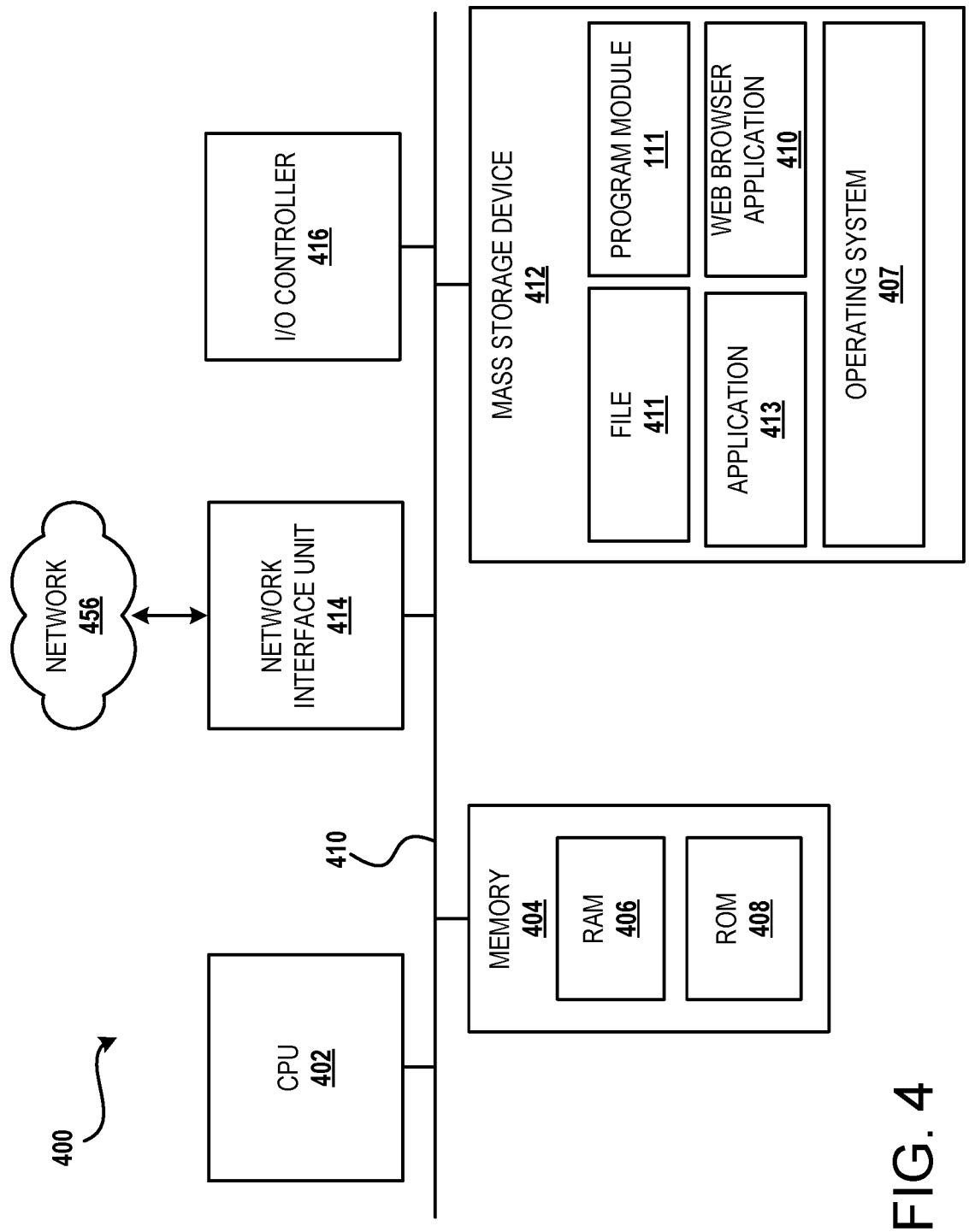
FIG. 4 is a computer architecture diagram illustrating an illustrative computer hardware and software architecture for a computing system capable of implementing aspects of the techniques and technologies presented herein.

FIG. 4 shows additional details of an example computer architecture 400 for a computer, such as the computing device 101 (FIG. 1), capable of executing the program components described above identification of documents based on location, usage patterns, and content. Thus, the computer architecture 400 illustrated in FIG. 4 illustrates an architecture for a server computer, mobile phone, a PDA, a smart phone, a desktop computer, a netbook computer, a tablet computer, and/or a laptop computer. The computer architecture 400 may be utilized to execute any aspects of the software components presented herein.

The computer architecture 400 illustrated in FIG. 4 includes a central processing unit 402 ("CPU"), a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer architecture 400, such as during startup, is stored in the ROM 408. The computer architecture 400 further includes a mass storage device 412 for storing an operating system 407, and one or more application programs including, but not limited to, the application 413, program module 111, and a web browser application 410. The illustrated mass storage device 412 may also store a file 411, which may in any format containing any type of information, note data, word document data, spreadsheet data, etc.

The mass storage device 412 is connected to the CPU 402 through a mass storage controller (not shown) connected to the bus 410. The mass storage device 412 and its associated computer-readable media provide non-volatile storage for the computer architecture 400. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. For purposes the claims, the phrase "computer storage medium," "computer-readable storage medium" and variations thereof, does not include waves, signals, and/or other transitory and/or intangible communication media, per se.

According to various configurations, the computer architecture 400 may operate in a networked environment using logical connections to remote computers through the network 456 and/or another network (not shown). The computer architecture 400 may connect to the network 456 through a network interface unit 414 connected to the bus 410. It should be appreciated that the network interface unit 414 also may be utilized to connect to other types of networks and remote computer systems. The computer architecture 400 also may include an input/output controller 416 for receiving and processing input from a number of other devices, including a keyboard, mouse, or electronic stylus (not shown in FIG. 4). Similarly, the input/output controller 416 may provide output to a display screen, a printer, or other type of output device (also not shown in FIG. 4).

It should be appreciated that the software components described herein may, when loaded into the CPU 402 and executed, transform the CPU 402 and the overall computer architecture 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 400 in order to store and execute the software components presented herein. It also should be appreciated that the computer architecture 400 may include other types of computing devices, including hand-held computers, embedded computer systems, personal digital assistants, and other types of computing devices known to those skilled in the art. It is also contemplated that the computer architecture 400 may not include all of the components shown in FIG. 4, may include other components that are not explicitly shown in FIG. 4, or may utilize an architecture completely different than that shown in FIG. 4.

Figure 5:
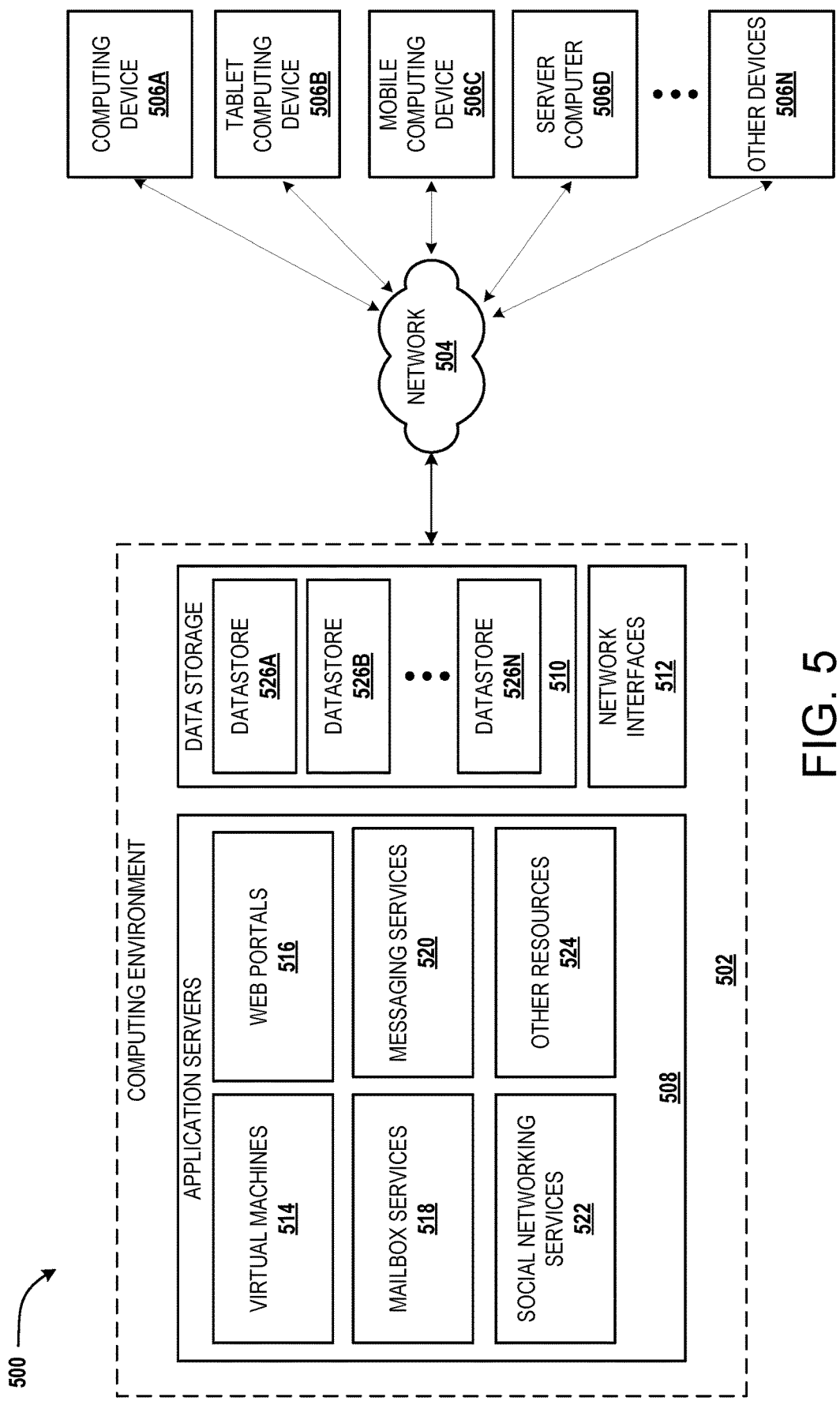
FIG. 5 is a diagram illustrating a distributed computing environment capable of implementing aspects of the techniques and technologies presented herein.

FIG. 5 depicts an illustrative distributed computing environment 500 capable of executing the software components described herein for identification of documents based on location, usage patterns, and content, among other aspects. Thus, the distributed computing environment 500 illustrated in FIG. 5 can be utilized to execute any aspects of the software components presented herein. For example, the distributed computing environment 500 can be utilized to execute aspects of the program module 111 and/or other software components described herein.

According to various implementations, the distributed computing environment 500 includes a computing environment 502 operating on, in communication with, or as part of the network 456. The network 504 may be or may include the network 456, described above with reference to FIG. 4. The network 504 also can include various access networks. One or more client devices 506A-506N (hereinafter referred to collectively and/or generically as "clients 506") can communicate with the computing environment 502 via the network 504 and/or other connections (not illustrated in FIG. 5). In one illustrated configuration, the clients 506 include a computing device 506A such as a laptop computer, a desktop computer, or other computing device; a slate or tablet computing device ("tablet computing device") 506B; a mobile computing device 506C such as a mobile telephone, a smart phone, or other mobile computing device; a server computer 506D; and/or other devices 506N. It should be understood that any number of clients 506 can communicate with the computing environment 502. Two example computing architectures for the clients 506 are illustrated and described herein with reference to FIGS. 4 and 6. It should be understood that the illustrated clients 506 and computing architectures illustrated and described herein are illustrative, and should not be construed as being limited in any way.

In the illustrated configuration, the computing environment 502 includes application servers 508, data storage 510, and one or more network interfaces 512. According to various implementations, the functionality of the application servers 508 can be provided by one or more server computers that are executing as part of, or in communication with, the network 504. The application servers 508 can host various services, virtual machines, portals, and/or other resources. In the illustrated configuration, the application servers 508 host one or more virtual machines 514 for hosting applications or other functionality. According to various implementations, the virtual machines 514 host one or more applications and/or software modules for identification of documents based on location, usage patterns, and content. It should be understood that this configuration is illustrative, and should not be construed as being limiting in any way. The application servers 508 also host or provide access to one or more portals, link pages, Web sites, and/or other information ("Web portals") 516.

According to various implementations, the application servers 508 also include one or more mailbox services 518 and one or more messaging services 520. The mailbox services 518 can include electronic mail ("email") services. The mailbox services 518 also can include various personal information management ("PIM") services including, but not limited to, calendar services, contact management services, collaboration services, and/or other services. The messaging services 520 can include, but are not limited to, instant messaging services, chat services, forum services, and/or other communication services.

The application servers 508 also may include one or more social networking services 522. The social networking services 522 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 522 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 522 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 522 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 522 are not mentioned herein for the sake of brevity. As such, the above configurations are illustrative, and should not be construed as being limited in any way. According to various implementations, the social networking services 522 may host one or more applications and/or software modules for providing the functionality described herein. For instance, any one of the application servers 508 may communicate or facilitate the functionality and features described herein. For instance, a social networking application, mail client, messaging client or a browser running on a phone or any other client 506 may communicate with a networking service 522 and facilitate the functionality, even in part, described above with respect to FIG. 3.

As shown in FIG. 5, the application servers 508 also can host other services, applications, portals, and/or other resources ("other resources") 524. The other resources 524 can include, but are not limited to, OCR or spreadsheet display functionality. It thus can be appreciated that the computing environment 502 can provide integration of the concepts and technologies disclosed herein provided herein with various mailbox, messaging, social networking, and/or other services or resources.

As mentioned above, the computing environment 502 can include the data storage 510. According to various implementations, the functionality of the data storage 510 is provided by one or more databases operating on, or in communication with, the network 504. The functionality of the data storage 510 also can be provided by one or more server computers configured to host data for the computing environment 502. The data storage 510 can include, host, or provide one or more real or virtual datastores 526A-526N (hereinafter referred to collectively and/or generically as "datastores 526"). The datastores 526 are configured to host data used or created by the application servers 508 and/or other data. Although not illustrated in FIG. 5, the datastores 526 also can host or store note files, word files, spreadsheet files, data structures, algorithms for execution by a recommendation engine, and/or other data utilized by any application program or another module, such as the program module 111. Aspects of the datastores 526 and/or data within the datastores 526 may be associated with data defining one or more geographic locations and/or a geographic area.

The computing environment 502 can communicate with, or be accessed by, the network interfaces 512. The network interfaces 512 can include various types of network hardware and software for supporting communications between two or more computing devices including, but not limited to, the clients 506 and the application servers 508. It should be appreciated that the network interfaces 512 also may be utilized to connect to other types of networks and/or computer systems.

It should be understood that the distributed computing environment 500 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 500 provides the software functionality described herein as a service to the clients 506. It should be understood that the clients 506 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 500 to utilize the functionality described herein, among other aspects. In one specific example, as summarized above, techniques described herein may be implemented, at least in part, by the web browser application 410 of FIG. 4, which works in conjunction with the application servers 508 of FIG. 5.

Turning now to FIG. 6, an illustrative computing device architecture 600 for a computing device that is capable of executing various software components described herein for identification of documents based on location, usage patterns, and content. The computing device architecture 600 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 600 is applicable to any of the clients 506 shown in FIG. 5. Moreover, aspects of the computing device architecture 600 may be applicable to traditional desktop computers, portable computers (e.g., laptops, notebooks, ultra-portables, and netbooks), server computers, and other computer systems, such as described herein with reference to FIG. 4. For example, the single touch and multi-touch aspects disclosed herein below may be applied to desktop computers that utilize a touchscreen or some other touch-enabled device, such as a touch-enabled track pad or touch-enabled mouse.

The computing device architecture 600 illustrated in FIG. 6 includes a processor 602, memory components 604, network connectivity components 606, sensor components 608, input/output components 610, and power components 612. In the illustrated configuration, the processor 602 is in communication with the memory components 604, the network connectivity components 606, the sensor components 608, the input/output ("I/O") components 610, and the power components 612. Although no connections are shown between the individuals components illustrated in FIG. 6, the components can interact to carry out device functions. In some configurations, the components are arranged so as to communicate via one or more busses (not shown).

The processor 602 includes a central processing unit ("CPU") configured to process data, execute computer-executable instructions of one or more application programs, and communicate with other components of the computing device architecture 600 in order to perform various functionality described herein. The processor 602 may be utilized to execute aspects of the software components presented herein and, particularly, those that utilize, at least in part, a touch-enabled input.

In some configurations, the processor 602 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 602 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 602 is, or is included in, a system-on-chip ("SoC") along with one or more of the other components described herein below. For example, the SoC may include the processor 602, a GPU, one or more of the network connectivity components 606, and one or more of the sensor components 608. In some configurations, the processor 602 is fabricated, in part, utilizing a package-on-package ("PoP") integrated circuit packaging technique. The processor 602 may be a single core or multi-core processor.

The processor 602 may be created in accordance with an ARM architecture, available for license from ARM HOLDINGS of Cambridge, United Kingdom. Alternatively, the processor 602 may be created in accordance with an x86 architecture, such as is available from INTEL CORPORATION of Mountain View, Calif. and others. In some configurations, the processor 602 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 604 include a random access memory ("RAM") 614, a read-only memory ("ROM") 616, an integrated storage memory ("integrated storage") 618, and a removable storage memory ("removable storage") 620. In some configurations, the RAM 614 or a portion thereof, the ROM 616 or a portion thereof, and/or some combination the RAM 614 and the ROM 616 is integrated in the processor 602. In some configurations, the ROM 616 is configured to store a firmware, an operating system or a portion thereof (e.g., operating system kernel), and/or a bootloader to load an operating system kernel from the integrated storage 618 and/or the removable storage 620.

The integrated storage 618 can include a solid-state memory, a hard disk, or a combination of solid-state memory and a hard disk. The integrated storage 618 may be soldered or otherwise connected to a logic board upon which the processor 602 and other components described herein also may be connected. As such, the integrated storage 618 is integrated in the computing device. The integrated storage 618 is configured to store an operating system or portions thereof, application programs, data, and other software components described herein.

The removable storage 620 can include a solid-state memory, a hard disk, or a combination of solid-state memory and a hard disk. In some configurations, the removable storage 620 is provided in lieu of the integrated storage 618. In other configurations, the removable storage 620 is provided as additional optional storage. In some configurations, the removable storage 620 is logically combined with the integrated storage 618 such that the total available storage is made available as a total combined storage capacity. In some configurations, the total combined capacity of the integrated storage 618 and the removable storage 620 is shown to a user instead of separate storage capacities for the integrated storage 618 and the removable storage 620.

The removable storage 620 is configured to be inserted into a removable storage memory slot (not shown) or other mechanism by which the removable storage 620 is inserted and secured to facilitate a connection over which the removable storage 620 can communicate with other components of the computing device, such as the processor 602. The removable storage 620 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 604 can store an operating system. According to various configurations, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 606 include a wireless wide area network component ("WWAN component") 622, a wireless local area network component ("WLAN component") 624, and a wireless personal area network component ("WPAN component") 626. The network connectivity components 606 facilitate communications to and from the network 656 or another network, which may be a WWAN, a WLAN, or a WPAN. Although only the network 656 is illustrated, the network connectivity components 606 may facilitate simultaneous communication with multiple networks, including the network 504 of FIG. 5. For example, the network connectivity components 606 may facilitate simultaneous communications with multiple networks via one or more of a WWAN, a WLAN, or a WPAN.

The network 656 may be or may include a WWAN, such as a mobile telecommunications network utilizing one or more mobile telecommunications technologies to provide voice and/or data services to a computing device utilizing the computing device architecture 600 via the WWAN component 622. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 656 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 64 may be configured to provide voice and/or data communications with any combination of the above technologies. The network 656 may be configured to or adapted to provide voice and/or data communications in accordance with future generation technologies.

In some configurations, the WWAN component 622 is configured to provide dual-multi-mode connectivity to the network 656. For example, the WWAN component 622 may be configured to provide connectivity to the network 656, wherein the network 656 provides service via GSM and UMTS technologies, or via some other combination of technologies. Alternatively, multiple WWAN components 622 may be utilized to perform such functionality, and/or provide additional functionality to support other non-compatible technologies (i.e., incapable of being supported by a single WWAN component). The WWAN component 622 may facilitate similar connectivity to multiple networks (e.g., a UMTS network and an LTE network).

The network 656 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 624 is configured to connect to the network 656 via the WI-FI access points. Such connections may be secured via various encryption technologies including, but not limited, WI-FI Protected Access ("WPA"), WPA2, Wired Equivalent Privacy ("WEP"), and the like.

The network 656 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 626 is configured to facilitate communications with other devices, such as peripherals, computers, or other computing devices via the WPAN.

The sensor components 608 include a magnetometer 628, an ambient light sensor 630, a proximity sensor 632, an accelerometer 634, a gyroscope 636, and a Global Positioning System sensor ("GPS sensor") 638. It is contemplated that other sensors, such as, but not limited to, temperature sensors or shock detection sensors, also may be incorporated in the computing device architecture 600.

The magnetometer 628 is configured to measure the strength and direction of a magnetic field. In some configurations the magnetometer 628 provides measurements to a compass application program stored within one of the memory components 604 in order to provide a user with accurate directions in a frame of reference including the cardinal directions, north, south, east, and west. Similar measurements may be provided to a navigation application program that includes a compass component. Other uses of measurements obtained by the magnetometer 628 are contemplated.

The ambient light sensor 630 is configured to measure ambient light. In some configurations, the ambient light sensor 630 provides measurements to an application program stored within one the memory components 604 in order to automatically adjust the brightness of a display (described below) to compensate for low-light and high-light environments. Other uses of measurements obtained by the ambient light sensor 630 are contemplated.

The proximity sensor 632 is configured to detect the presence of an object or thing in proximity to the computing device without direct contact. In some configurations, the proximity sensor 632 detects the presence of a user's body (e.g., the user's face) and provides this information to an application program stored within one of the memory components 604 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 632 are contemplated.

The accelerometer 634 is configured to measure proper acceleration. In some configurations, output from the accelerometer 634 is used by an application program as an input mechanism to control some functionality of the application program. For example, the application program may be a video game in which a character, a portion thereof, or an object is moved or otherwise manipulated in response to input received via the accelerometer 634. In some configurations, output from the accelerometer 634 is provided to an application program for use in switching between landscape and portrait modes, calculating coordinate acceleration, or detecting a fall. Other uses of the accelerometer 634 are contemplated.

The gyroscope 636 is configured to measure and maintain orientation. In some configurations, output from the gyroscope 636 is used by an application program as an input mechanism to control some functionality of the application program. For example, the gyroscope 636 can be used for accurate recognition of movement within a 3D environment of a video game application or some other application. In some configurations, an application program utilizes output from the gyroscope 636 and the accelerometer 634 to enhance control of some functionality of the application program. Other uses of the gyroscope 636 are contemplated.

The GPS sensor 638 is configured to receive signals from GPS satellites for use in calculating a location. The location calculated by the GPS sensor 638 may be used by any application program that requires or benefits from location information. For example, the location calculated by the GPS sensor 638 may be used with a navigation application program to provide directions from the location to a destination or directions from the destination to the location. Moreover, the GPS sensor 638 may be used to provide location information to an external location-based service, such as E911 service. The GPS sensor 638 may obtain location information generated via WI-FI, WIMAX, and/or cellular triangulation techniques utilizing one or more of the network connectivity components 606 to aid the GPS sensor 638 in obtaining a location fix. The GPS sensor 638 may also be used in Assisted GPS ("A-GPS") systems.

The I/O components 610 include a display 640, a touchscreen 642, a data I/O interface component ("data I/O") 644, an audio I/O interface component ("audio I/O") 646, a video I/O interface component ("video I/O") 648, and a camera 650. In some configurations, the display 640 and the touchscreen 642 are combined. In some configurations two or more of the data I/O component 644, the audio I/O component 646, and the video I/O component 648 are combined. The I/O components 610 may include discrete processors configured to support the various interface described below, or may include processing functionality built-in to the processor 602.

The display 640 is an output device configured to present information in a visual form. In particular, the display 640 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 640 is a liquid crystal display ("LCD") utilizing any active or passive matrix technology and any backlighting technology (if used). In some configurations, the display 640 is an organic light emitting diode ("OLED") display. Other display types are contemplated.

The touchscreen 642, also referred to herein as a "touch-enabled screen," is an input device configured to detect the presence and location of a touch. The touchscreen 642 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 642 is incorporated on top of the display 640 as a transparent layer to enable a user to use one or more touches to interact with objects or other information presented on the display 640. In other configurations, the touchscreen 642 is a touch pad incorporated on a surface of the computing device that does not include the display 640. For example, the computing device may have a touchscreen incorporated on top of the display 640 and a touch pad on a surface opposite the display 640.

In some configurations, the touchscreen 642 is a single-touch touchscreen. In other configurations, the touchscreen 642 is a multi-touch touchscreen. In some configurations, the touchscreen 642 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 642. As such, a developer may create gestures that are specific to a particular application program.

In some configurations, the touchscreen 642 supports a tap gesture in which a user taps the touchscreen 642 once on an item presented on the display 640. The tap gesture may be used for various reasons including, but not limited to, opening or launching whatever the user taps. In some configurations, the touchscreen 642 supports a double tap gesture in which a user taps the touchscreen 642 twice on an item presented on the display 640. The double tap gesture may be used for various reasons including, but not limited to, zooming in or zooming out in stages. In some configurations, the touchscreen 642 supports a tap and hold gesture in which a user taps the touchscreen 642 and maintains contact for at least a pre-defined time. The tap and hold gesture may be used for various reasons including, but not limited to, opening a context-specific menu.

In some configurations, the touchscreen 642 supports a pan gesture in which a user places a finger on the touchscreen 642 and maintains contact with the touchscreen 642 while moving the finger on the touchscreen 642. The pan gesture may be used for various reasons including, but not limited to, moving through screens, images, or menus at a controlled rate. Multiple finger pan gestures are also contemplated. In some configurations, the touchscreen 642 supports a flick gesture in which a user swipes a finger in the direction the user wants the screen to move. The flick gesture may be used for various reasons including, but not limited to, scrolling horizontally or vertically through menus or pages. In some configurations, the touchscreen 642 supports a pinch and stretch gesture in which a user makes a pinching motion with two fingers (e.g., thumb and forefinger) on the touchscreen 642 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 642. As such, the above gestures should be understood as being illustrative and should not be construed as being limiting in any way.

The data I/O interface component 644 is configured to facilitate input of data to the computing device and output of data from the computing device. In some configurations, the data I/O interface component 644 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 646 is configured to provide audio input and/or output capabilities to the computing device. In some configurations, the audio I/O interface component 646 includes a microphone configured to collect audio signals. In some configurations, the audio I/O interface component 646 includes a headphone jack configured to provide connectivity for headphones or other external speakers. In some configurations, the audio I/O interface component 646 includes a speaker for the output of audio signals. In some configurations, the audio I/O interface component 646 includes an optical audio cable out.

The video I/O interface component 648 is configured to provide video input and/or output capabilities to the computing device. In some configurations, the video I/O interface component 648 includes a video connector configured to receive video as input from another device (e.g., a video media player such as a DVD or BLURAY player) or send video as output to another device (e.g., a monitor, a television, or some other external display). In some configurations, the video I/O interface component 648 includes a High-Definition Multimedia Interface ("HDMI"), mini-HDMI, micro-HDMI, DisplayPort, or proprietary connector to input/output video content. In some configurations, the video I/O interface component 648 or portions thereof is combined with the audio I/O interface component 646 or portions thereof.

The camera 650 can be configured to capture still images and/or video. The camera 650 may utilize a charge coupled device ("CCD") or a complementary metal oxide semiconductor ("CMOS") image sensor to capture images. In some configurations, the camera 650 includes a flash to aid in taking pictures in low-light environments. Settings for the camera 650 may be implemented as hardware or software buttons.

Although not illustrated, one or more hardware buttons may also be included in the computing device architecture 600. The hardware buttons may be used for controlling some operational aspect of the computing device. The hardware buttons may be dedicated buttons or multi-use buttons. The hardware buttons may be mechanical or sensor-based.

The illustrated power components 612 include one or more batteries 652, which can be connected to a battery gauge 654. The batteries 652 may be rechargeable or disposable. Rechargeable battery types include, but are not limited to, lithium polymer, lithium ion, nickel cadmium, and nickel metal hydride. Each of the batteries 652 may be made of one or more cells.

The battery gauge 654 can be configured to measure battery parameters such as current, voltage, and temperature. In some configurations, the battery gauge 654 is configured to measure the effect of a battery's discharge rate, temperature, age and other factors to predict remaining life within a certain percentage of error. In some configurations, the battery gauge 654 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 612 may also include a power connector, which may be combined with one or more of the aforementioned I/O components 610. The power components 612 may interface with an external power system or charging equipment via an I/O component.

Based on the foregoing, it should be appreciated that concepts and technologies have been disclosed herein that identify documents based on location, usage patterns and content. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, which is set forth in the following claims.

What is claimed is:

1. A computer-implemented method, comprising:
obtaining, from a computing device associated with a user, location data;
obtaining, from a user calendar, a current context indicating performance of a first instance of a scheduled activity for the user;
analyzing the location data to determine a location of the user;
identifying that a file was generated or received by the computing device at the determined location of the user during the performance of the first instance of the scheduled activity, wherein the file includes at least one of image data or text data;
storing the determined location of the user and the current context indicating the performance of the first instance of the scheduled activity for the user in association with the file;
determining that a location of the computing device exceeds a predetermined distance from the determined location of the user;
monitoring the location of the computing device after determining that the location of the computing device exceeds the predetermined distance from the determined location of the user;
determining when the location of the computing device returns to the determined location of the user;
in response to determining when the location of the computing device returns to the determined location of the user, determining that the user calendar indicates performance of a second instance of the same scheduled activity for the user; and
automatically generating a file recommendation in accordance with the performance of the second instance of the same scheduled activity for the user, the file recommendation comprising at least an indication of the file that was previously generated or received by the computing device at the determined location of the user during the performance of the first instance of the scheduled activity.

2. The computer-implemented method of claim 1, further comprising automatically displaying a rendering of the file on a display device of the computing device in response to determining when the location of the computing device returns to the determined location of the user and determining that the user calendar indicates performance of the second instance of the same scheduled activity for the user.

3. The computer-implemented method of claim 2, wherein the file comprises an image, wherein the rendering of the file comprises a rendering of the image.

4. The computer-implemented method of claim 2, wherein the file comprises text content, wherein the rendering of the file comprises a rendering of the text content.

5. The computer-implemented method of claim 1, wherein identifying that the file was generated or received by the computing device comprises receiving image data for the file from a camera of the computing device.

6. The computer-implemented method of claim 1, wherein identifying that the file was generated or received by the computing device comprises receiving the file from a remote computer.

7. A computing device, comprising:
a processor; and
a computer-readable storage medium in communication with the processor, the computer-readable storage medium having computer-executable instructions stored thereupon which, when executed by the processor, cause the computing device to:
receive, from a remote computing device, location data;
determine that a user calendar indicates performance of a first instance of a scheduled activity for a user;
determine a location of the remote computing device based, at least in part, on the location data;
determine that a file is associated with the location based, at least in part, on a determination of at least one of:
 the file was caused to be generated by the remote computing device while at the location,
 the file was received by the remote computing device while at the location, or
 the user searched for the file while at the location;
determine that an updated location of the remote computing device exceeds a predetermined distance from the location;
monitor the updated location after determining that the updated location exceeds the predetermined distance from the location;
determine when the updated location indicates that the remote computing device returns to the location;
in response to determining when the updated location indicates that the remote computing device returns to the location, determine that the user calendar indicates performance of a second instance of the same scheduled activity for the user;
generate one or more document recommendations in accordance with the performance of the second instance of the same scheduled activity for the user, wherein the one or more document recommendations include the file; and
provide, to the remote computing device, the one or more document recommendations.

8. The computing device of claim 7, wherein generating the one or more document recommendations includes identifying one or more files from a remote storage service that are associated with an account of the user.

9. The computing device of claim 7, wherein the computer-executable instructions further cause the computing device to associate a second file with the location in response to a creation of the second file while the user is at the location.

10. The computing device of claim 7, wherein the computer-executable instructions further cause the computing device to associate a second file with the location in response to an access of the second file while the user is at the location.

11. The computing device of claim 7, wherein the file is photographic data.

12. The computing device of claim 7, wherein the file comprises text data.

13. The computing device of claim 7, wherein generating the document recommendations comprises including one or more documents stored on the remote computing device.

14. The computing device of claim 7, wherein the computer-executable instructions further cause the computing device to cause at least a portion of the one or more document recommendations to be presented within a graphical user interface on a display associated with the remote computing device.

15. The computing device of claim 7, wherein generating the document recommendations comprises utilizing a machine learning mechanism.

16. A computer-readable storage medium having computer-executable instructions stored thereupon which, when executed by a computer, cause the computer to:
analyze positioning data to determine a location of a user;
identify that the location is associated with a file interacted with by the user while at the location;
determine that a user calendar indicates performance of a first instance of a scheduled activity for the user;
analyze the positioning data to determine that an updated location of the user exceeds a predetermined distance from the location;
monitor the updated location after determining that the updated location exceeds the predetermined distance from the location;
determine when the updated location indicates that the user returns to the location;
in response to determining when the updated location indicates that the user returns to the location, determine that the user calendar indicates performance of a second instance of the same scheduled activity for the user;
generate one or more document recommendations in accordance with the performance of the second instance of the same scheduled activity for the user, wherein the one or more document recommendations includes the file; and
provide for display, the one or more document recommendations.

17. The computer-readable storage medium of claim 16, wherein identifying that the location is associated with the file includes identifying that the file includes photograph data generated at the location.

* * * * *